June 24, 1930.     G. R. BOTT     1,765,648
ROLLER BEARING CAGE
Filed Sept. 9, 1926     2 Sheets-Sheet 1
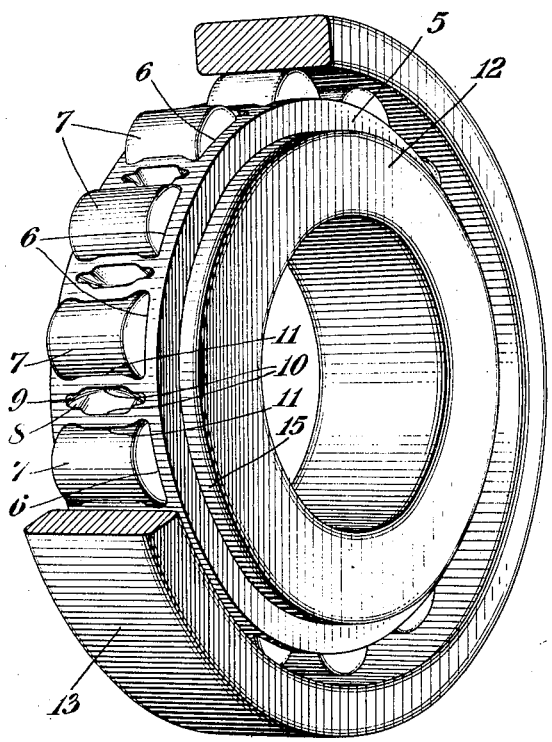
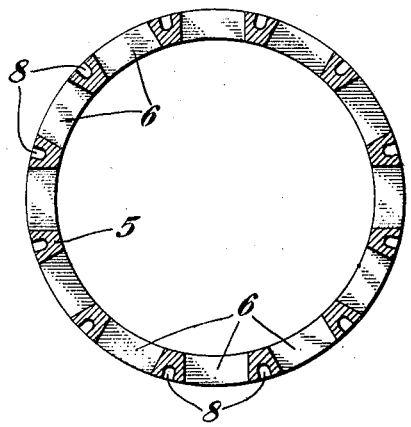
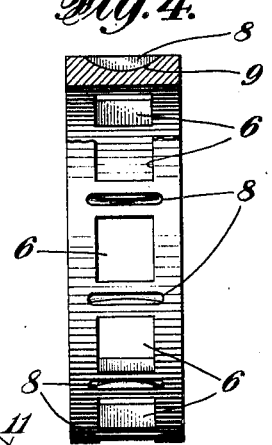
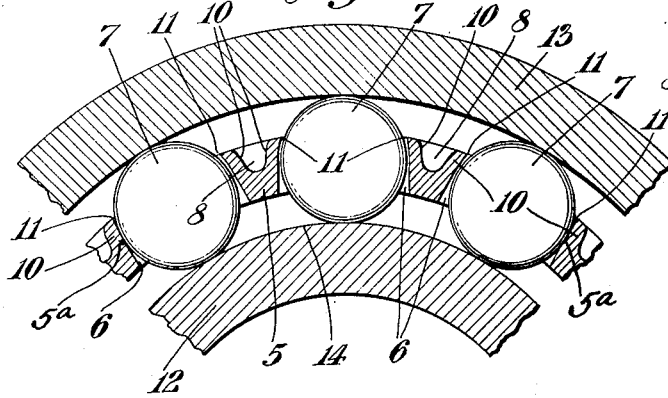
INVENTOR
George R. Bott.
BY
HIS ATTORNEY June 24, 1930.  G. R. BOTT  1,765,648
ROLLER BEARING CAGE
Filed Sept. 9, 1926  2 Sheets-Sheet 2
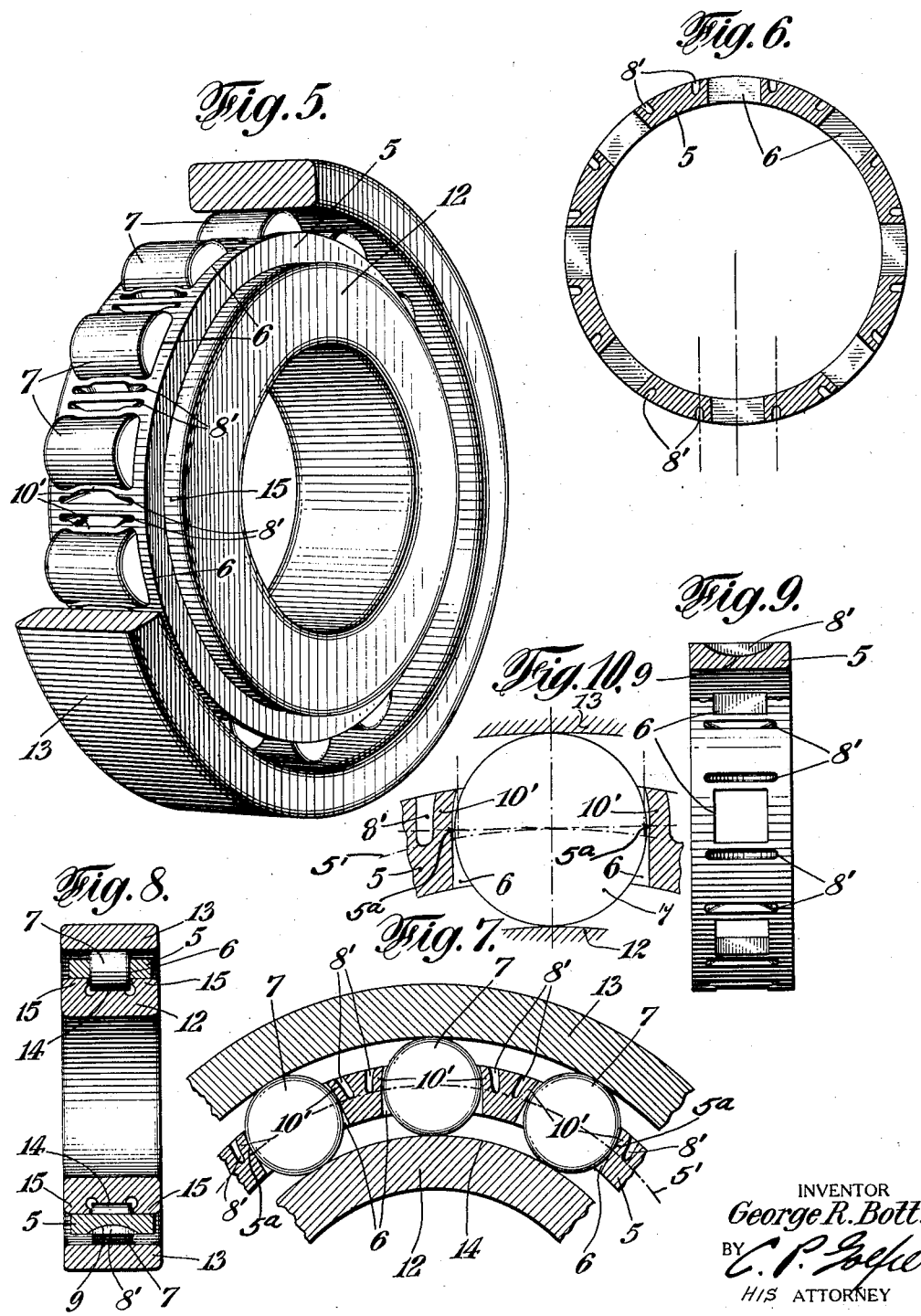
INVENTOR
George R. Bott.
BY
HIS ATTORNEY Patented June 24, 1930

1,765,648

UNITED STATES PATENT OFFICE

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK

ROLLER-BEARING CAGE

Application filed September 9, 1926. Serial No. 134,372.

This invention relates to an improved roller bearing cage, and has for its primary object to provide a one piece radial bearing cage of this type as distinguished from the multi-part roller cages of the prior art, and which therefore, will be of more rugged and sturdy construction and can be fabricated at appreciably lower cost.

It is another object of the invention to provide a fully machined one-piece roller cage of formed or cast metal as differentiated from the metal tubing or pressed sheet metal commonly utilized in the prior art for this purpose, and which is of such construction that when said cage with the rollers is operatively combined and related with the inner and outer bearing rings, the rollers will be maintained in proper circumferentially spaced relation to each other while at the same time the rollers will have only a casual, intermittent tangential line contact at diametrically opposite points with surfaces of the cage structure, such points of contact being located outwardly of the pitch line of the bearing rollers.

Briefly stated, the essential feature of my present invention is primarily characterized by the fact that the one piece cage ring is provided with spaced roller receiving openings therein and parts of the ring metal at opposite sides of each opening are distorted or displaced to narrow said openings at the outer side section of the ring and retain the rollers therein in the event the outer bearing ring is removed. This displacement of the cage material is exactly controlled to insure only a single line of contact between the rollers and the side walls of the respective cage openings extending in parallel relation to the axis of the bearing. Such contacting engagement between the rollers and the cage is of a non-positive or intermittent character, and it will therefore, be understood that I have succeeded by such construction in reducing frictional resistance to the free rotation of the rollers to a minimum, thereby enabling such a bearing to be operated at exceedingly high speeds with comparatively little wear of the bearing cage.

With the above and other objects in view, the invention consists in the improved roller bearing cage, and in the several novel structural features thereof as will be hereinafter more fully described, illustrated in the accompanying drawings, and subsequently incorporated in the subjoined claims.

In the drawings, wherein I have disclosed several simple and practical embodiments of the invention, and in which similar reference characters designate corresponding parts throughout the several views,—

Figure 1 is a perspective view showing one embodiment of the improved roller cage, a part of the outer ring of the bearing being broken away;

Fig. 2 is an enlarged fragmentary sectional view in the mid-plane of the bearing;

Fig. 3 is a sectional view of the complete bearing cage taken in the plane thereof before assembly and deformation;

Fig. 4 is an edge view of the cage as shown in Fig. 3, partly in section;

Fig. 5 is a perspective view similar to Fig. 1 showing a slightly modified form of my improved roller cage;

Fig. 6 is a mid-sectional view through the modified form of roller cage similar to Fig. 3;

Fig. 7 is an enlarged fragmentary sectional view similar to Fig. 2 of the modified construction;

Fig. 8 is a diametrical sectional view through the complete bearing;

Fig. 9 is an edge view similar to Fig. 4 of the alternative form of the device, and Fig. 10 is an enlarged detail view showing a section of the bearing cage and one of the bearing rollers to more clearly illustrate the elemental line of permissible contact between the roller and the cage.

Referring in detail to the drawings, and for the present more particularly to Figs. 1 to 4 thereof, the roller cage consists of a single one piece ring or annulus 5 of formed or cast metal, such as steel, brass or bronze, which is fully machined with the greatest accuracy. This ring is suitably provided with circumferentially spaced openings 6 therein of rectangular form, the length and width of these openings being predetermined in accordance with the length and diameters of the rollers to be loosely confined or held therein. These rollers indicated at 7 may be of the usual type formed from hardened and highly polished steel.

Between the openings 6 and in the outer portion of the cage structure transversely extending channels or grooves 8 are provided, the base walls 9 thereof preferably extending in a semi-circular arc and having a length slightly exceeding the length of the openings 6. As herein shown, the lowest points on the base walls 9 is located approximately midway between the inner and outer faces of the cage ring. However, it will be understood that these grooves or channels 8 may be of other form than that shown.

After the cage ring has been provided with the openings 6 and the channels or grooves 8 as seen in Fig. 3 of the drawings, said cage is arranged upon the inner bearing ring 12, said ring being secured in a suitable fixture. The rollers are then inserted into the square openings of the cage and thereafter by means of a suitable tool engaging in the grooves or channels 8, the opposite side walls of the roller receiving openings are deformed and the cage material laterally displaced inwardly towards the rollers. This operation is very accurately executed, and from reference to Fig. 10 of the drawings, as a result thereof it will be observed, that the distance between the opposite side edges of the roller receiving opening at the outer side of the cage ring is less than the diameter of the roller while the distance between said walls on the pitch line of the cage indicated at 5′ is somewhat greater than the diameter of the roller. Accordingly, when the outer bearing ring 13 is applied to hold the rollers on the pitch line 5′, there is a clearance between the opposite side walls of the cage opening from the pitch line to the outer surface of the cage, and the roller can contact with the cage only at its greatest diameter, outwardly of the pitch line and along an elemental line indicated at 5ᵃ which is parallel with the axis of the bearing. However, since the distance between these two elemental lines of contact at opposite sides of the roller opening exceeds the diameter of the roller, it will be understood that while the roller is held on the pitch line by the outer bearing ring 13, it will have complete freedom or looseness within the cage opening. When the rollers are moved circumferentially in the operation of the bearing, they can contact with the cage only at the single point 5ᵃ which is parallel with the bearing axis. While I have shown a cage of plane rectangular cross sectional form, it will be apparent that this is not essential and said cage may be made in various other cross sectional shapes.

In Figs. 5, 6 and 7 I have shown the cage ring provided with two of the transverse slots or grooves 8′ between the spaced roller receiver openings. As indicated in Figs. 6 and 7 of the drawings, these grooves 8′ may be variously spaced from each other in accordance with the arrangement of the cage openings or pockets and the number of bearing rollers to be contained therein. It will be understood that in this construction, the outer wall of each of the slots 8′ next adjacent to one of the roller receiving openings has a certain part of the metal laterally displaced as at 10′ to confine the roller against outward movement through the cage as above explained.

Each of the cage constructions above described is adapted to be assembled with the rollers between the inner and outer bearing rings 12 and 13 respectively. The inner bearing ring is formed in its outer circumference centrally thereof with the race 14 to receive the rollers 7, thereby providing the landes or flanges 15 at each side of this race upon which the roller cage is centered and loosely supported for rotative movement about said inner bearing ring. The bearing rollers are of course, held or retained on their pitch line by the outer ring of the bearing, and therefore since the cage is centered on the inner ring, it will be apparent that in the operation of the bearing only intermittent tangential line contact between the rollers and cage is possible and there is no positive or continuous contactual engagement of the cylindrical surfaces of the rollers with any part of the cage, the edges 11 of the deformed or displaced parts 10 being spaced apart for a distance exceeding the space between the adjacent points on the periphery of the roller. Therefore, in the operation of the bearing the rollers will have free rotation between the inner and outer bearing rings with a minimum of frictional resistance. Obviously, therefore, such a roller bearing provided with my new cage will have speed possibilities greatly exceeding the present types of such roller cages.

The deformed or displaced parts of the cage metal will however, effectively retain the rollers in the cage pockets in the handling of the inner bearing ring, with the cage and rollers during the assembly of the bearing in the shaft, or if at any time it becomes necessary to remove said parts from the outer ring of the bearing. It will be observed that this displacement of the cage material occurs only outside of the pitch line of the bearing rollers.

It will be obvious that a fully machined one piece roller cage formed of cast metal has many advantages both in manufacture and in functional operation over roller cages consisting of two or more parts and produced from thin walled tubing or from stamped or pressed metal sheets which has heretofore been the practice in one branch of this art. Thus, the necessity of drilling rivet holes and the application and heading of rivets to secure the cage parts in assembled relation is obviated, and by the elimination of such holes a cage structure of greater durability which can be fabricated in less time and at lower cost is provided.

I have herein disclosed two practical forms of my invention whereby the above result may be secured. Such illustrated constructions are however, largely suggestive, since it is possible that the desired end might also be attained by other more or less obvious modifications of such illustrated structures. Accordingly, it is to be understood that in practice I reserve the privilege of resorting to all such legitimate changes in the several essential features of my present improvements as may be fairly embodied within the spirit and scope of the invention as claimed.

I claim:

1. A roller bearing cage consisting of a one piece cage ring having spaced rectangular openings extending radially therethrough, bearing rollers rotatable in said openings and each opening having portions of its opposite side walls extending in substantially parallel relation to each other to the inner face of the cage ring, and other portions of said walls converging inwardly towards each other to the outer face of the ring on arcs the radii of which are greater than the periphery of the roller so that said roller will have contacting engagement with the opposite side walls of the opening only at points inwardly of the outer face of the ring to limit outward movement of the roller through said opening and the outer edges of said side walls are thereby prevented from contacting with the periphery of the roller.

2. In an anti-friction bearing, an inner bearing ring having a central circumferential race in its outer face and landes at opposite sides of said race, a roller cage ring having spaced rectangular openings extending radially therethrough supported upon said landes against radial movement relative to the bearing ring, bearing rollers in said openings and engaged on the race of the bearing ring and projecting outwardly through said openings for contact with an outer bearing ring, each of said openings having its inner portion of a width exceeding the diameter of the roller and the opposite side walls thereof extending in substantially parallel relation to each other to the inner face of the ring, said side walls converging inwardly towards each other to the outer face of the cage ring and providing lines of contact between the side walls of said ring and the periphery of the roller located inwardly of the outer face of the ring to thereby prevent contact of the outer side edges of said openings with the bearing rollers.

In testimony that I claim the foregoing as my invention, I have signed my name hereto.

GEORGE R. BOTT.